United States Patent
Simske et al.

(10) Patent No.: US 9,330,323 B2
(45) Date of Patent: May 3, 2016

(54) REDIGITIZATION SYSTEM AND SERVICE

(75) Inventors: Steven J Simske, Fort Collins, CO (US); Samson J. Liu, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/364,743

(22) PCT Filed: Apr. 29, 2012

(86) PCT No.: PCT/US2012/035718
§ 371 (c)(1),
(2), (4) Date: Jun. 12, 2014

(87) PCT Pub. No.: WO2013/165334
PCT Pub. Date: Nov. 7, 2013

(65) Prior Publication Data
US 2015/0049949 A1    Feb. 19, 2015

(51) Int. Cl.
*G06K 9/18* (2006.01)
*G06K 9/03* (2006.01)
*G06K 9/00* (2006.01)

(52) U.S. Cl.
CPC ............ *G06K 9/18* (2013.01); *G06K 9/00442* (2013.01); *G06K 9/03* (2013.01)

(58) Field of Classification Search
CPC ............ G06F 11/0787; G06F 17/2725; G06F 17/2735; G06F 11/0781; G06K 9/00442; G06K 9/18; G06K 9/08
See application file for complete search history.

(56) References Cited

U.S. PATENT DOCUMENTS

| | | | |
|---|---|---|---|
| 6,047,093 A | 4/2000 | Lopresti et al. | |
| 6,154,579 A | 11/2000 | Goldberg | |
| 6,618,697 B1 | 9/2003 | Kantrowitz | |
| 7,734,092 B2 | 6/2010 | Curtis et al. | |
| 7,936,951 B2 | 5/2011 | Duan | |
| 2002/0116291 A1* | 8/2002 | Grasso et al. | 705/27 |
| 2003/0177115 A1* | 9/2003 | Stern et al. | 707/4 |
| 2004/0037470 A1 | 2/2004 | Simske | |
| 2006/0023945 A1* | 2/2006 | King et al. | 382/173 |
| 2006/0285746 A1* | 12/2006 | Yacoub et al. | 382/176 |
| 2006/0288279 A1* | 12/2006 | Yacoub et al. | 715/530 |
| 2009/0019402 A1* | 1/2009 | Ke | G06K 9/2081 715/849 |

(Continued)

OTHER PUBLICATIONS

Laroum S. et al, "Hybred: and OCR Document Representation Classification Tasks", May 2011.

(Continued)

*Primary Examiner* — Jingge Wu
(74) *Attorney, Agent, or Firm* — Kacvinsky Daisak PLLC

(57) ABSTRACT

A system and method to error correct extant electronic documents is disclosed. An electronic document may be rasterized to obtain a pixel representation of the electronic document (e.g., raster image). One or more optical character recognition (OCR) tasks may be performed on the raster image of the electronic document. Errors discovered by the OCR tasks may be corrected and a customized error corrected version of the electronic document may be created and stored. If the author of the electronic document is known, the raster image may be compared to a personalized tf*idf error dictionary associated with the author to determine known OCR errors specific to the author. The raster image may also be compared to a personalized electronic error dictionary associated with the author to determine known typographical errors specific to the author.

13 Claims, 5 Drawing Sheets

(56) References Cited

U.S. PATENT DOCUMENTS

| | | | |
|---|---|---|---|
| 2009/0089278 A1* | 4/2009 | Poola et al. | 707/5 |
| 2009/0144056 A1* | 6/2009 | Aizenbud-Reshef | G06K 9/723 |
| | | | 704/228 |
| 2009/0220175 A1 | 9/2009 | Tzadok | |
| 2009/0228499 A1* | 9/2009 | Schmidtler | G06N 99/005 |
| 2010/0110467 A1 | 5/2010 | Coniglio et al. | |
| 2010/0275118 A1* | 10/2010 | Iakobashvili | G06F 17/273 |
| | | | 715/257 |
| 2011/0066421 A1 | 3/2011 | Lee et al. | |
| 2011/0153653 A1* | 6/2011 | King et al. | 707/769 |
| 2011/0239111 A1* | 9/2011 | Grover | G06F 17/273 |
| | | | 715/257 |
| 2011/0249905 A1* | 10/2011 | Singh et al. | 382/225 |
| 2011/0258195 A1* | 10/2011 | Welling et al. | 707/740 |
| 2011/0296374 A1* | 12/2011 | Wu et al. | 717/104 |
| 2013/0088757 A1* | 4/2013 | Schmidtler | G06K 9/00469 |
| | | | 358/462 |
| 2014/0253977 A1* | 9/2014 | King et al. | 358/473 |

OTHER PUBLICATIONS

European Patent Office. Extended European Search Report. Mail Date Mar. 9, 2016. Appiication No. 12875858.8.

* cited by examiner

| | Original Text | Error Text | Type of Error | Error Rate | Prevalence |
|---|---|---|---|---|---|
| 210 | *-m | *-rn | Substitution / Insertion | $1.45 \times 10^{-3}$ | $1.03 \times 10^{-5}$ |
| 220 | *-m-* | *-rn-* | Substitution / Insertion | $1.28 \times 10^{-3}$ | $4.44 \times 10^{-5}$ |
| 230 | *-i-* | *-1-* | Substitution | $2.23 \times 10^{-4}$ | $4.34 \times 10^{-2}$ |
| 240 | *-c-* | *--* | Deletion | $4.67 \times 10^{-6}$ | $3.56 \times 10^{-3}$ |
| 250 | *--* | *-v-* | Insertion | $2.73 \times 10^{-9}$ | $2.73 \times 10^{-9}$ |

FIG. 2b
260

| | Original Text | Error Text | Type of Error | Error Rate in OCR Error Dictionary | Error Rate in Personalized Documents | tf*idf |
|---|---|---|---|---|---|---|
| 270 | *-m | *-rn | Substitution / Insertion | $1.45 \times 10^{-3}$ | $1.03 \times 10^{-5}$ | $1.03 \times 10^{-5}$ |

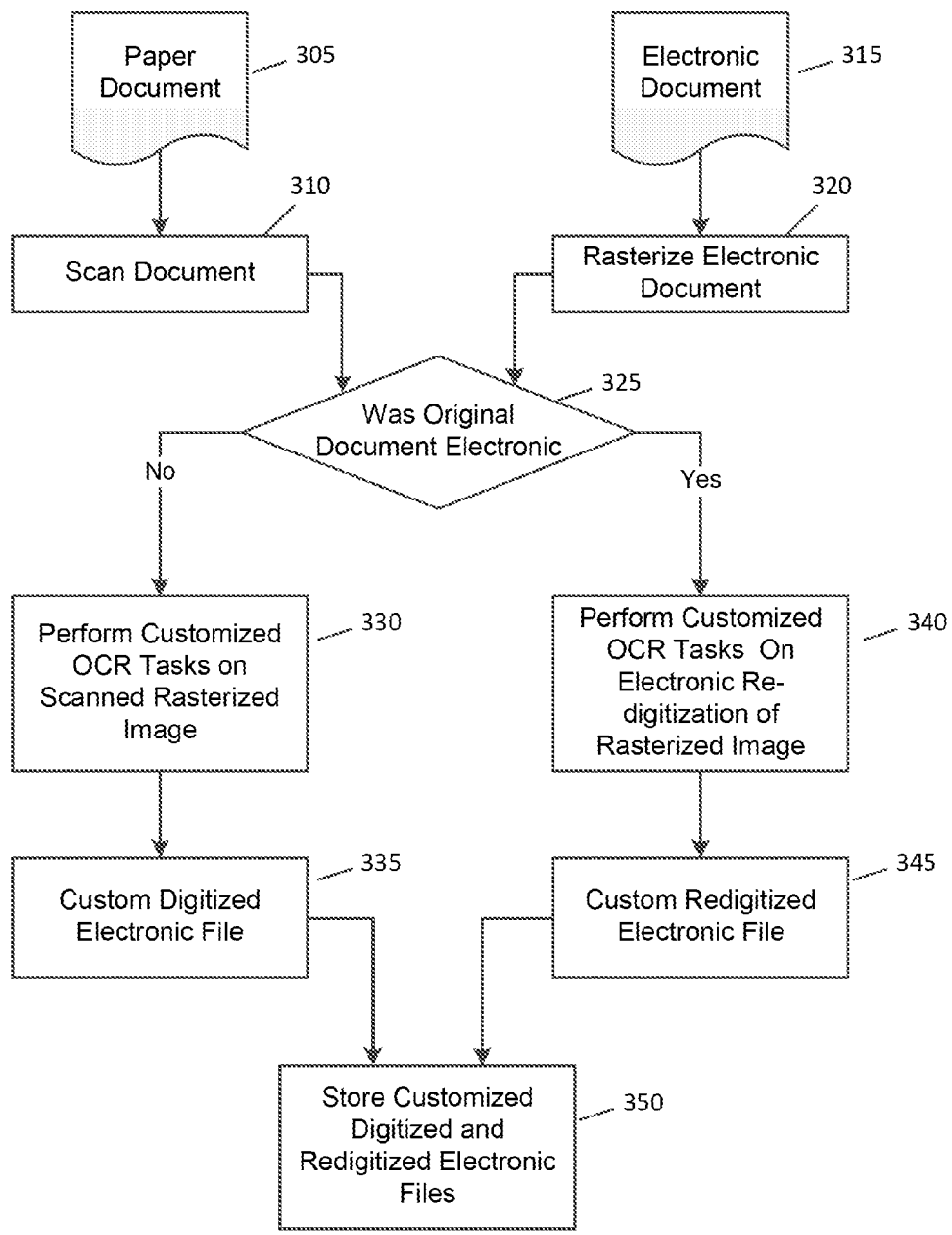

400

500

600

REDIGITIZATION SYSTEM AND SERVICE

BACKGROUND

Optical Character Recognition (OCR) systems are typically used for the digitization of paper assets—i.e. the "scanning" or "on-ramp" of physical items (usually documents). However, they can also be used to "re-digitize" documents extant in electronic form. Many documents are currently stored in rather spartan representations; for example, as completely flat PDFs, images or even videos. These documents can benefit from being fed as "input" to the OCR engine, and thus be enriched with the types of data extraction and meta-data creation that occur for scanned paper documents.

SUMMARY

In one example, a method to error correct extant electronic documents is disclosed. An electronic document may be rasterized to obtain a raster image. One or more optical character recognition (OCR) tasks may be performed on the raster image of the electronic document. Errors discovered by the OCR tasks may be corrected and a customized error corrected version of the electronic document may be created and stored. If the author of the electronic document is known, the raster image may be compared to a personalized tf*idf (term frequency*inverse document frequency) error dictionary associated with the author to determine known OCR errors specific to the author. The raster image may also be compared to a personalized electronic error dictionary associated with the author to determine known typographical errors specific to the author.

In another example, a master error corrected document may be created from among multiple versions of the same document.

BRIEF DESCRIPTION OF THE DRAWINGS

FIG. 2*a* illustrates a example of representative entries in an OCR error dictionary.

FIG. 2*b* illustrates an example of the relative occurrence of an error in a personalized dictionary.

FIG. 3 illustrates one embodiment of a logic flow in which a paper document and an electronic document may be redigitized and stored.

DETAILED DESCRIPTION

Figure 1:
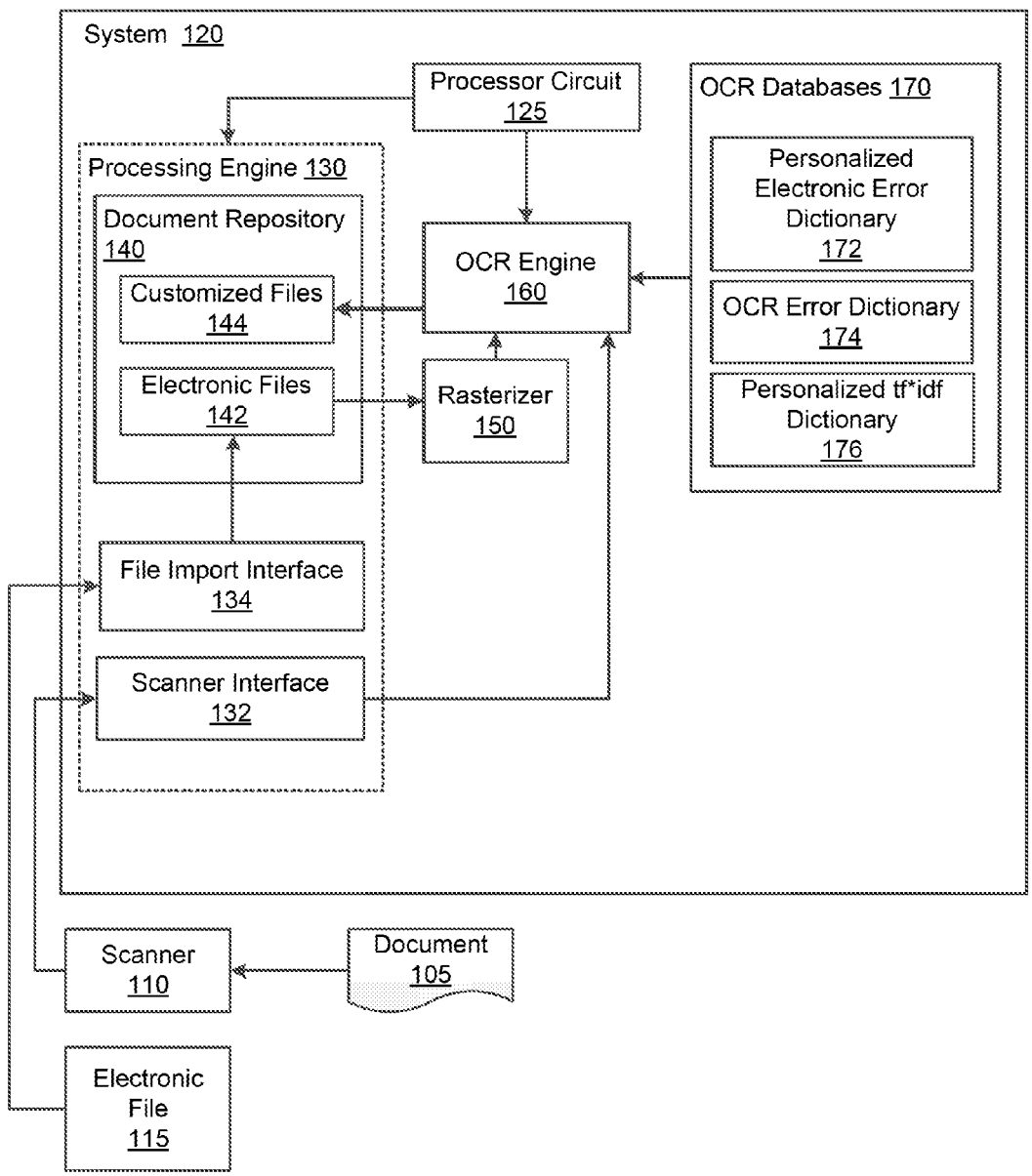
FIG. 1 illustrates one embodiment of a digitization and re-digitization system.

Presented herein is an approach to create an enhanced error corrected electronic document from one or both of a scanned paper document and an existing electronic document. Moreover, a master error corrected document may be created from among multiple versions of the same document.

In order to "rationalize" both paper (e.g., scanned documents) and electronic input (e.g., electronic documents), three distinct databases may be used (Personalized electronic error dictionary, OCR error dictionary, and Personalized We dictionary) to improve the accuracy of the custom digitized/redigitized file that is created by analyzing both types of documents with the OCR engine. To rationalize refers to making the scanned and electronic documents equivalent in terms of the content associated with each—both the data and the meta-data in the document.

The files (documents, composite documents, linked documents, etc.) may be pre-existing, in a document repository (e.g., database, Sharepoint, private cloud, public cloud, etc.) as pre-enriched electronic documents or may be entered into the document repository after being, created by scanning new paper documents. After scanning a paper document or rasterizing an electronic document, any file brought into the system has OCR performed on it using one or more OCR engines that may be integrated into the system.

There is a difference in the next step based on whether the document has been digitized (scanned and rasterized) from a paper document or redigitized from an existing electronic document. For digitization of a paper document, the customized OCR tasks performed may include applying an OCR error dictionary, a personalized tf*idf error dictionary, or combine both dictionaries to identify and correct errors. For re-digitization of an electronic document, the customized OCR tasks performed include applying an OCR error dictionary, a personalized tf*idf error dictionary, and a personalized electronic error dictionary to identify and correct errors in the documents.

The OCR error dictionary keeps track of known OCR errors that occur during paper document scanning and may also be readily computed from separate re-digitization of electronic documents having known text regions. The personalized tf*idf error dictionary keeps track of a person's personal corpora of salient terms tf*idf represents the mathematical relation (term frequency)*(inverse document frequency), td*idf highlights the relative occurrence of a term in a smaller corpus in comparison to another usually much larger corpus. There may be many different representations of tf and idf based on for example, whether the term occurred or not (e.g., binary), how many times the term occurred, what percent of words are each term (which normalizes the length of the document) and using log instead of linear scales for the number of occurrences. Lastly, the personalized electronic error dictionary keeps track of electronic errors made by the individual such as when typing a document in a word processing program.

In one embodiment, electronic documents may be enriched to match the richness of newly-created and newly-scanned documents. Most electronic documents have not been subjected to OCR error correction because they may not have been scanned into electronic form. These documents may have been initially created in electronic form. Rasterizing the electronic document presents the opportunity to subject the rasterized image file to OCR processing. Rasterizing refers to the process of computing a mapping from one electronic format of a document to a pixel representation of the document.

In another embodiment, both scanning errors and typing errors may be identified and corrected. Scanning errors are discoverable using standard OCR error correction dictionaries and techniques. Typing errors may be corrected by re-digitizing an electronic document and subjecting the rasterized image to OCR processing.

In still, another embodiment, a "gold standard" customized electronic file may be, created from the differential error rates in multiple electronic and scanned versions of a document by selecting a document representation that minimizes the overall error rate. A document repository may store multiple versions of the same document. Each document may be linked together based on a high similarity so as to warrant treating them as different versions of the same document. Each document may be subjected to multiple OCR tasks to identify and remove any errors. Each document may then be compared and contrasted such that the differential error rates are determined. A customized file may then be created that represents an amalgamation of the various versions. The customized file may be referred to as the gold standard and stored in the document repository.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates one embodiment 100 of a digitization and re-digitization system 120. The system 120 includes a processor circuit 125, a processing engine 130, a document repository 140 (e.g., memory), a rasterizer 150, an OCR engine 160, and OCR databases 170.

The processing engine 130 may include a scanner interface 132 and a file import interface 134. The scanner interface 132 may be coupled with a scanner 110. Scanner 110 may scan a document 105 (e.g., paper document) and perform its own rasterization to create a raster image (e.g., pixel representation) of the document 105. The raster image may be input into the system 120 via scanner interface 132. Some files may already exist in electronic form and may be imported into the system 120 via the file import interlace 132. By way of example only this may include a universal serial bus (USB) drive containing an electronic file in a particular format (e.g., word processing format, pdf format, etc.). In addition, the file import interface may also be capable of accepting electronic files wirelessly or from an external network such as the Internet. The file formats may be variable as well.

Electronic files 142 may be stored within the document repository 140 under control of the processing engine 130. The document repository 140 may be coupled with the file import interface 134. The document repository 140 may also store customized files 144 upon performance of customized OCR tasks to raster images of documents.

The OCR engine 160, under control of the processing circuit 125, may perform custom OCR tasks on both scanned documents and electronic documents. If a document was scanned by a scanner 110, it has already been rasterized and may be fed directly to the OCR engine 160. An electronic file undergoes rasterization via rasterizer 150 before being fed to OCR engine 160.

The customized OCR tasks depend on multiple OCR error dictionaries stored by the OCR databases 170. A first dictionary may be the OCR error dictionary 174. The OCR error dictionary 174 dictionary keeps track of known OCR errors that occur during paper document scanning and may also be readily computed from separate re-digitization of electronic documents having known text regions. A second dictionary may be the personalized tf*idf error dictionary 176. The personalized tf*idf error dictionary 176 keeps track of a person's personal corpora of salient terms. The tf*idf term represents the mathematical relation (term frequency)*(inverse document frequency). td*idf highlights the relative occurrence of a term in a smaller corpus in comparison to another usually much larger corpus. A third dictionary is the personalized electronic error dictionary 172. The personalized electronic error dictionary 172 keeps track of electronic errors made by the individual such as when typing a document in a word processing program. This may include commonly repeated ms-spellings of words, for instance.

It should be noted that a separate OCR task involves determining the author of a document whether it is scanned or electronic. There may be various ways to determine authorship. For example, author(s) names) may be embedded in a barcode identifier if available, or they may be extracted from the document using various well known methods. It is possible that the author(s) cannot be determined for some documents. In such cases, only the OCR error dictionary may be applied. The personalized error dictionaries cannot be applied without knowing which particular personalized error dictionary is applicable.

For scanned documents, the OCR tasks apply the OCR error dictionary 174 and the personalized tf*idf error dictionary 176 to the raster image of the scanned document. For electronic documents, the OCR tasks apply the OCR error dictionary 174, the personalized tf*idf error dictionary 176, and the personalized electronic error dictionary 172 to the raster image of the scanned document. The personalized electronic error dictionary 172 is not applied to scanned documents because they were not originally in electronic format.

Once the relevant OCR tasks have been applied to a document (scanned or electronic), a customized error corrected version of the document may be created by the OCR engine 160. This customized error corrected version of the document may then be placed into a customized files portion 144 of the document repository 140.

FIG. 2a illustrates an example of representative entries in an OCR error dictionary 200. The OCR error dictionary keeps track of known OCR errors that may occur during scanning and may also be readily computed from separate re-digitization of electronic documents having known text regions. FIG. 2a shows representations of some of the errors that may be observed.

The first row 210 shows the substitution of the letter "m" at the end of a word (thus the "*-m" original text) with the two consecutive letters "r" and "n". This may also be classifiable as a single substitution of the letter "n" for the letter "m" along with an insertion of the letter "r". The prevalence in the data base, $1.03 \times 10^{-5}$, indicates that 10.3 events out of a million in the output of the OCR engine are such a substitution/insertion, and the error rate, $1.45 \times 10^{-3}$ indicates that 0.145% of the times the letter "m" occurs it will be substituted by the letter "r" and the letter "n" in error. The second row 220 considers the same error, except that the letter "m" can occur anywhere inside word, not just at the end. As expected, the prevalence increases due to the inclusion of all occurrences of the letter "m", not just those at the end of words. The error rate, however, is similar. The third row 230 considers all occurrences of the non-capitalized letter "i", which is 4.34% of the characters in the database, and the substitution error rate of the number "1" for the letter "i", which is 0.0223% of the times the letter "i" occurs. In the fourth row 240, a pure deletion of the letter "c" is shown. The letter "c" comprises 0.356% of the characters, and is deleted or dropped 4.67 times out of each 1 million of its occurrences in the original text. The fifth row 250 shows a pure insertion of the letter "v". The letter "v" is inserted in 2.73 out of a billion locations in which it can be inserted. Note that here the error rate and prevalence for this occurrence are identical. In practice, a table of all error types (e.g., substitutions, insertions and deletions) along with their prevalence and error rates as defined here is kept in the OCR error dictionary. The OCR dictionary is generalized to a very large, non-customized dataset of electronic documents so that data gathering and statistics computing may be fully automated.

Also note that FIG. 2a can readily accommodate any scale of error including substitutions of entire words or phrases—e.g. "helplessness" for "hopelessness"—which is useful for many modern OCR engines that attempt to provide dictionary-based corrections on the input images.

FIG. 2b illustrates an example of the relative occurrence of an error in a personalized dictionary 260. This is a personal elaboration of the standard OCR dictionary meaning this error dictionary is specific to a particular person.

The relative occurrence (tf*idf) of the first type of error shown in row 260 is thus 0.924 meaning it is only 92.4% as likely to occur for the user as for the general population. When not enough statistics are available for the individual to make this correction, the default statistics in the OCR error dictionary may be used. Thus, for an individual user, FIG. 2b accounts for differences in OCR engines and algorithms used, the location of the original text with respect to other text, fonts used, scanners used, etc.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation FIG. 3 illustrates one embodiment of a logic flow 300 in which a paper document and an electronic document may be redigitized and stored. The logic flow 300 may determine whether a document 305, 315 was either a scanned document or a rasterized electronic document and perform OCR tasks depending on that outcome. The OCR tasks result in an error corrected customized electronic file that may be stored. The logic flow 300 may be representative of some or all of the operations executed by one or more embodiments described herein.

In the illustrated embodiment shown in FIG. 3, a scanner 110 may scan a document 305 into the system 120 at block 310. For instance, the scanner 110 may rasterize a paper document and forward to a buffer in the system 120 before it is subjected to an OCR engine 160. The embodiments are not limited to this example.

Similarly, the logic flow 300 may utilize a rasterizer 150 to rasterize an electronic document 315 at block 320. For instance, the rasterizer 150 may operate on the electronic document to convert an electronic file to a raster image file before it is subjected to an OCR engine 160. The embodiments are not limited to this example.

In computer graphics, a raster image, or bitmap, is a matrix-based data structure representing a generally rectangular grid of pixels, or points of color. Raster images are stored in image files with varying formats. An image of text or an electronic file containing text that is not in image file format may be rasterized or converted to a raster image. Once a file or an image is converted to a raster image, it may be operated on by an optical character recognition system (e.g., OCR engine 160) to recognize and identify individual characters as letters or known symbols using a knowledge database.

OCR generally refers to the conversion of images of text into machine-encoded text. OCR is a field of research in pattern recognition, artificial intelligence and computer vision. OCR systems may require calibration to read a specific font. For purposes of the present disclosure, it is assumed the OCR engine is capable of working with multiple fonts.

Images of text are not always perfectly clear. As a result, the OCR engine may attribute a section of an image to an incorrect character or characters. Some of these errors were previously described with reference to FIG. 2a. Once the OCR engine has completed its task, the data may be re-formatted into an editable text file format. The text may contain recognition errors, however. Because the text is now in a 'readable' format, additional text based applications may be applied to detect errors. This includes spell-checking and may also include more complex contextual decisions based on word meanings, etc. An OCR error correction dictionary 174 can be maintained that stores the occurrence probability of some errors and is used to help correct or refine the results of the OCR tasks.

The logic flow 300 may make a determination as to the source of the original document at block 325. For instance, the system 120 will treat scanned documents from paper differently than rasterized images of electronic documents. To do so means that the original format of the document is determined. The embodiments are not limited to this example.

The logic flow 300 may perform customized OCR tasks on a scanned rasterized image at block 330. For instance, if it was determined that the original document was a scanned document, the OCR engine 160 will perform a set of OCR tasks on the raster image. The OCR tasks may include applying an OCR error dictionary and a personalized tf*idf error dictionary 176 to the raster image to identify potential errors. The embodiments are not limited to this example.

The logic flow 300 may create a customized digitized electronic file at block 335. For instance, upon completion of the OCR tasks described in block 330 above, the OCR engine may create an error corrected version of the raster image. The embodiments are not limited to this example.

The logic flow 300 may perform customized OCR tasks on a scanned rasterized image at block 340. For instance, if it was determined that the original document was an electronic document, the OCR engine 160 will perform a different set of OCR tasks on the raster image. The OCR tasks may include applying an OCR error dictionary a personalized tf*idf error dictionary, and a personalized electronic error dictionary 172 to the raster image to identify potential errors. The embodiments are not limited to this example.

The logic flow 300 may create a customized re-digitized electronic file at block 345. For instance, upon completion of the OCR tasks described in block 340 above, the OCR engine may create an error corrected version of the raster image. The embodiments are not limited to this example.

The logic flow 300 may store the customized digitized or re-digitized electronic files at block 345. For instance, upon completion of the OCR tasks described in block 335 and 345 above, the OCR engine may store the error corrected versions of the raster images. The embodiments are not limited to this example.

Figure 4:
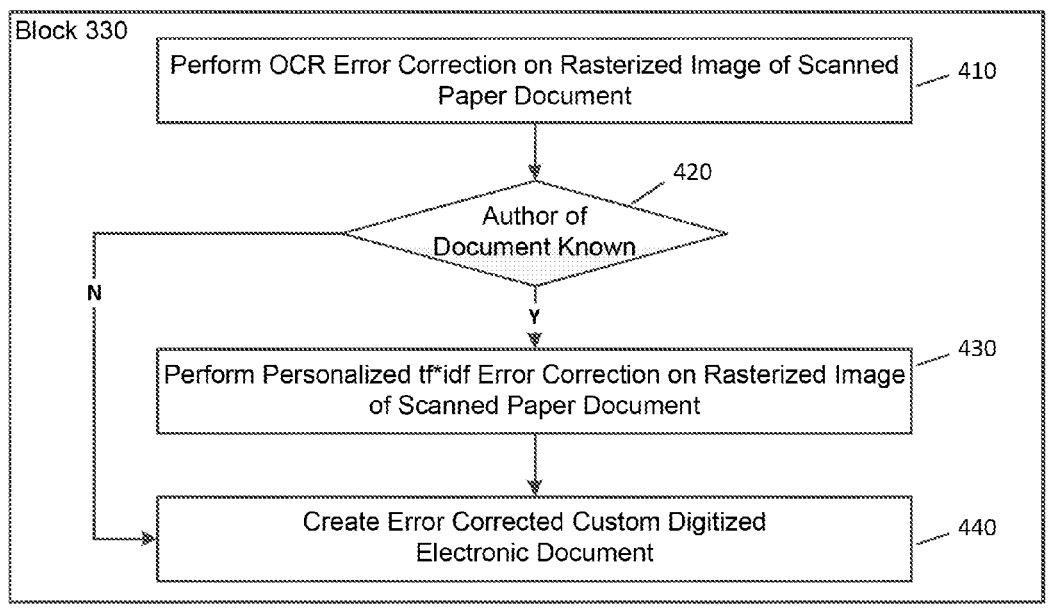
FIG. 4 illustrates one embodiment of a logic flow describing the OCR tasks performed on a scanned paper document.

FIG. 4 illustrates one embodiment of a logic flow 400 describing the OCR tasks performed on a scanned paper document. The logic flow 400 may perform multiple OCR tasks on a scanned raster image as described in block 330 of FIG. 3. The OCR tasks may include performing OCR error correction and personalized tf*idf error correction to the raster image to identify potential errors. The logic flow 400 may be representative of some or all of the operations executed by one or more embodiments described herein.

In the illustrated embodiment shown in FIG. 4, the OCR engine 160 may perform OCR error correction at block 410. For instance, the OCR engine 160 may use an OCR error correction dictionary 174 to perform character recognition to identify letters, numbers, symbols or other known characters in the rasterized image of the electronic document. Some of these characters may be mis-identified. In addition, some of the errors may occur at a certain frequency. This information may be stored in the OCR error correction dictionary 174 and may be used to error-correct the results of the OCR tasks. The embodiments are not limited to this example.

The logic flow 400 may determine the author of the document at block 420. For instance, some OCR tasks require knowledge of the author. This is because some of the error dictionaries, like the tf*idf error correction dictionary and the personalized electronic error correction dictionary, are personalized to a specific person. The data in such personalized dictionaries may only be used to error correct a document authored by the person associated with the personalized dictionaries. The embodiments are not limited to this example.

There may be various ways to determine authorship of a document. For example, author(s) name(s) may be embedded in a barcode identifier if available, or they may be extracted from the document using various well known methods. It is possible that the author(s) cannot be determined for some documents. In such cases, only the OCR error dictionary may be applied and control of the logic flow 400 will be sent to block 440 described below.

The logic flow 400 may perform personalized tf*idf error correction at block 430. For instance, when the author is known from block 420, the logic flow 400 may utilize the personalized tf*idf error dictionary 174 to perform error correction on the rasterized image of the scanned document. A personalized tf*idf error correction dictionary 176 may keep track of errors for the author that corresponds to the authors personal corpora of salient terms. This is akin to an author's vocabulary of key words. The embodiments are not limited to this example.

The logic flow 400 may create an error-corrected custom digitized electronic document at block 440. For instance, once the OCR tasks have been completed and the rasterized image has been error-corrected, a custom digitized electronic document may be created. The custom digitized electronic document may be saved in any number of electronic file formats pursuant to block 350 of FIG. 3. The embodiments are not limited to this example.

Figure 5:
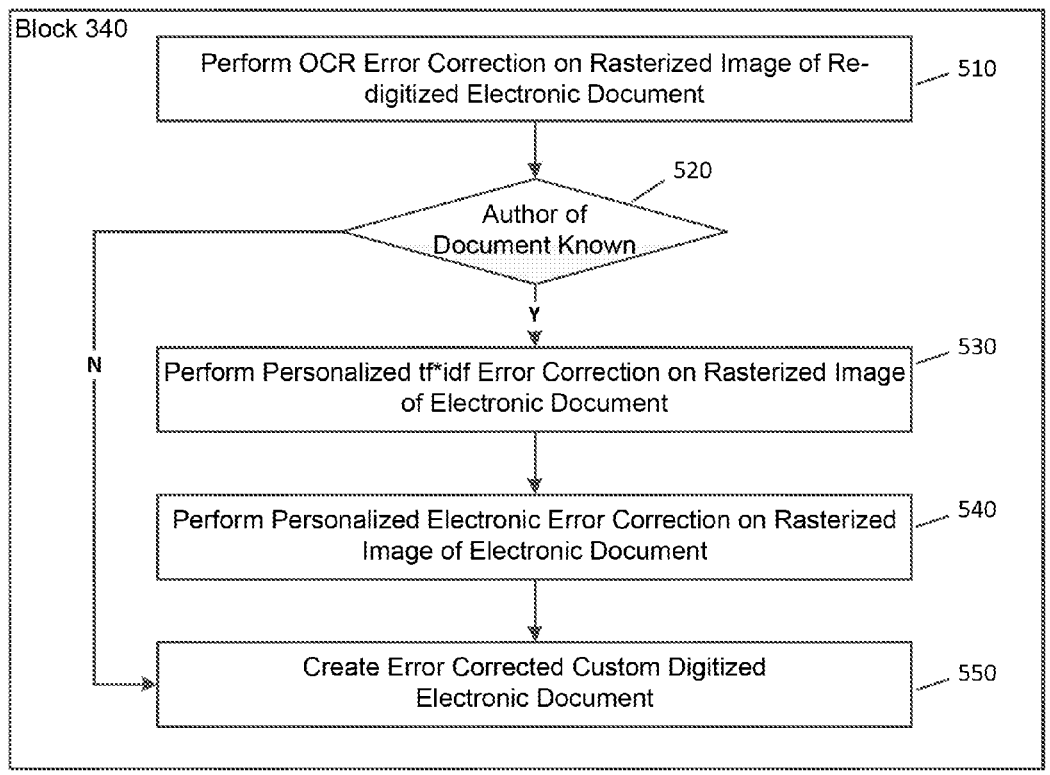
FIG. 5 illustrates one embodiment of a logic flow describing the OCR tasks performed on a rasterized electronic document.

FIG. 5 illustrates one embodiment of a logic flow 500 describing the OCR tasks performed on a rasterized electronic document. The logic flow 500 may perform multiple OCR tasks on a scanned raster image as described in block 340 of FIG. 3. The OCR tasks may include performing OCR error correction, personalized tf*idf error correction and personalized electronic error correction to the raster image to identify potential errors. The logic flow 500 may be representative of some or all of the operations executed by one or more embodiments described herein.

In the illustrated embodiment shown in HG. 5, the OCR engine 160 may perform OCR dictionary error correction at block 510. For instance, the OCR engine 160 use an OCR error correction dictionary 174 to perform character recognition to identify letters, numbers, symbols or other known characters in the rasterized image of the electronic document. Some of these characters may be mis-identified. In addition, some of the errors may occur at a certain frequency. This information may be stored in the OCR error correction dictionary 174 and may be used to error-correct the results of the OCR tasks. The embodiments are not limited to this example.

The logic flow 500 may determine the author of the document at block 520. For instance, some OCR tasks require knowledge of the author. This is because some of the error dictionaries like the tf*idf error correction dictionary and the personalized electronic error correction dictionary are personalized to a specific person. The data in such personalized dictionaries may only be used to error correct a document authored by the person associated with the personalized dictionaries. The embodiments are not limited to this example.

The logic flow 500 may perform personalized tf*idf error correction at block 530. For instance, when the author is known from block 520 the logic flow 500 may utilize the personalized tf*idf error dictionary 174 to perform error correction on the rasterized image of the electronic document. A personalized tf*idf error correction dictionary 176 may keep track of errors for the author that corresponds to the author's personal corpora of salient terms. This is akin to an author's vocabulary of key words. The embodiments are not limited to this example.

The logic flow 500 may perform personalized electronic error correction at block 540. For instance, when the author is known from block 520 the logic flow 500 may utilize the personalized electronic error dictionary 172 to perform error correction on the rasterized image of the electronic document. The author's personalized electronic error dictionary may identify electronic errors made by the author (or by the whole electronic corpus, if appropriate) when the document was created or edited. These errors may be are catalogued along the lines of FIGS. 2a-2b. For example, if the user continually mistypes "therefore" as "theirfore", this will show up in the statistics and when the electronic document is rasterized this knowledge can be used to error correct the mistakes. The embodiments are not limited to this example.

The logic flow 500 may create an error-corrected custom digitized electronic document at block 550. For instance, once the OCR tasks have been completed and the rasterized image has been error-corrected, a custom digitized electronic document may be created. The custom digitized electronic document may be saved in any number of electronic file formats pursuant to block 350 of FIG. 3. The embodiments are not limited to this example.

Figure 6:
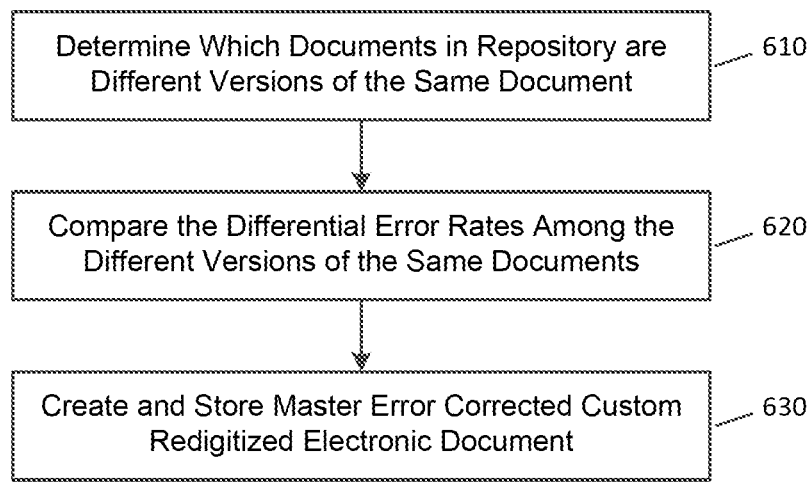
FIG. 6 illustrates one embodiment of a logic flow, in which multiple versions of a document are merged into a single document.

FIG. 6 illustrates one embodiment of a logic flow 600 in which multiple versions of a document are merged into a single document. The logic flow 600 may. The logic flow 600 may be representative of some or all of the operations executed by one or more embodiments described herein.

In the illustrated embodiment shown in FIG. 6, the OCR engine 160 may determine which documents may be different versions of the same document at block 610. For instance, the OCR engine 160 may be able to compare all the documents in the document repository 140 to determine which particular documents are so similar as to be different versions of the same document. The embodiments are not limited to this example.

The logic flow 600 may compare the differential error rates of documents at block 620. For instance, each of the documents that have been identified collectively as the same document has its own error correction characteristics. These differential error rates may be compared with one another to determine what a newly created electronic document would look like after incorporating the differential error rates for the collection of documents. The embodiments are not limited to this example.

The logic flow 600 may create and store a master error-corrected custom re-digitized electronic document at block 630. For instance, using the results obtained from block 620, the OCR engine 160 may create a master or "gold standard" document that would be the most error free of all similar documents. For example, suppose the document repository 140 contains twelve (12) copies of an electronic document (e.g. a contract that multiple parties were working on) created by twelve different authors. The OCR engine 160 can identify them and incorporate the error correction results of all of them into a single master error corrected custom re-digitized electronic document. The embodiments are not limited to this example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
rasterizing an electronic document to obtain a raster image of the electronic document;
determining the author of the electronic document;
performing one or more optical character recognition (OCR) tasks on the raster image of the electronic document, performing the OCR tasks including identifying digitization errors in the electronic document based on a comparison to a personalized tf*idf error dictionary associated with the author to determine known OCR errors specific to the author, the personalized tf*idf error dictionary representing (i) whether a term occurred or not, (ii) how many times the term occurred, (iii) what percent of words are each term, (iv) using log instead of linear scales for the number of occurrences of the term, (v) or a combination thereof;
correcting errors discovered by the OCR tasks; and
creating a customized error corrected version of the electronic document.

2. The method of claim 1, further comprising storing the customized error corrected version of the electronic document.

3. The method of claim 1, at least one of the OCR tasks comprising:
comparing the raster image to an OCR error dictionary to determine known OCR errors.

4. The method of claim 1, further comprising: searching for multiple versions of the same electronic document; comparing the differential error rates among the multiple versions of the electronic document; creating a master error corrected custom redigitized electronic document; and storing the master error corrected custom redigitized electronic document.

5. An apparatus comprising:
a processor circuit;
a processing engine to access stored electronic documents;

an optical character recognition (OCR) engine under control of the processor; a rasterizer to create raster images of the electronic documents;

an OCR error dictionary stored in a memory; a personalized tf*idf dictionary stored in the memory; and a personalized electronic error dictionary stored in the memory, the OCR engine to perform OCR tasks on the raster images using the OCR error dictionary, the personalized tf*idf dictionary, and the personalized electronic error dictionary, the OCR tasks to:

determine errors in the raster images;

correct the errors in the raster images;

create a customized error-corrected version of the electronic document; and store the customized error-corrected version of the electronic document in the memory.

6. An article of manufacture comprising a non-transitory computer-readable storage medium containing instructions that if executed enable a system to:

access an electronic document;

obtain a pixel representation of a first version of an electronic document;

perform one or more optical character recognition (OCR) tasks on the pixel representation of the electronic document;

correct errors in the first version of the electronic document discovered by the OCR tasks;

search for a second version of the electronic document; and create a customized error corrected version of the electronic document based on a comparison of a differential error rate between the first version of the electronic document and the second version of the electronic document.

7. The article of claim 6, further comprising instructions that if executed enable the system to store the customized error corrected version of the electronic document.

8. The article of claim 6, further comprising instructions that if executed enable the system to compare the pixel representation of the electronic document to an OCR error dictionary to determine known OCR errors.

9. The article of claim 6, further comprising instructions that if executed enable the system to determine the author of the electronic document.

10. The article of claim 9, further comprising instructions that if executed enable the system to compare the pixel representation of the electronic document to a personalized tf*idf error dictionary associated with the author to determine known OCR errors specific to the author, the personalized tf*idf error dictionary representing one or more of (i) whether a term occurred or not, (ii) how many times the term occurred, (iii) what percent of words are each term and (iv) using log instead of linear scales for the number of occurrences of the term.

11. The article of claim 9, further comprising instructions that if executed enable the system to compare the pixel representation of the electronic document to a personalized electronic error dictionary associated with the author to determine known typographical errors specific to the author.

12. The article of claim 9, further comprising instructions that if executed enable the system to search for the second version of the electronic document based on a similarity level to the first version of the electronic document.

13. The method of claim 1, further comprising determining if the electronic document originated as an electronic document or a scanned version of a paper document.

\* \* \* \* \*